(12) United States Patent
Yamashita et al.

(10) Patent No.: US 11,007,549 B2
(45) Date of Patent: May 18, 2021

(54) FLOCKING POWDER COATED ARTICLE

(71) Applicant: CHUO HATSUJO KABUSHIKI KAISHA, Aichi (JP)

(72) Inventors: Takashi Yamashita, Aichi (JP); Hidekazu Ito, Aichi (JP); Seiki Ito, Aichi (JP); Toshio Kuwayama, Aichi (JP)

(73) Assignee: CHUO HATSUJO KABUSHIKI KAISHA, Aichi (JP)

( * ) Notice: Subject to any disclaimer, the term of this patent is extended or adjusted under 35 U.S.C. 154(b) by 124 days.

(21) Appl. No.: 15/774,826

(22) PCT Filed: Nov. 8, 2016

(86) PCT No.: PCT/JP2016/083125
§ 371 (c)(1),
(2) Date: May 9, 2018

(87) PCT Pub. No.: WO2017/082252
PCT Pub. Date: May 18, 2017

(65) Prior Publication Data
US 2018/0326450 A1 Nov. 15, 2018

(30) Foreign Application Priority Data
Nov. 9, 2015 (JP) .............................. JP2015-219909

(51) Int. Cl.
*F16F 1/12* (2006.01)
*B32B 5/16* (2006.01)
(Continued)

(52) U.S. Cl.
CPC ................. *B05D 1/06* (2013.01); *B05D 1/14* (2013.01); *B32B 5/16* (2013.01); *F16F 1/024* (2013.01);
(Continued)

(58) Field of Classification Search
CPC ... B05D 1/06; B05D 1/14; B05D 1/36; B05D 2504/00; B05D 1/34; B05D 2401/20;
(Continued)

(56) References Cited

U.S. PATENT DOCUMENTS 4,668,323 A * 5/1987 Lenards ................... B05D 1/16
156/242
9,919,337 B1 * 3/2018 Decker ................... B05C 19/00
(Continued)

FOREIGN PATENT DOCUMENTS

EP 0162645 A1 * 11/1985 ......... C04B 41/4505
JP S51-57740 5/1976
(Continued)

OTHER PUBLICATIONS

International Search Report and Written Opinion were dated Jan. 31, 2017 by the International Searching Authority for Application No. PCT/JP2016/083125, which was filed on Nov. 8, 2016, and published as WO 2017/082252 on May 18, 2017 (Applicant—Chuo Hatsujo Kabushiki Kaisha ) (Original 9 pages // Translation—2 pages).

*Primary Examiner* — Nathan L Van Sell
(74) *Attorney, Agent, or Firm* — Ballard Spahr LLP

(57) ABSTRACT

This flocking powder coated article comprises a base material (10) and a flocking coating layer (11). The flocking coating layer (11) includes: a coating film (110) constituted by a powder coating, and a portion of a flocking organic filler (13) buried in the powder coating; and a flocking layer (111) constituted by another portion of the flocking organic filler (13) projecting from the coating film (110). This flocking powder coated article does not have an adhesive layer for fixing the flocking organic filler (13).

20 Claims, 4 Drawing Sheets

(51) Int. Cl.
  *F16F 1/02* (2006.01)
  *F16F 1/06* (2006.01)
  *B05D 1/06* (2006.01)
  *B05D 1/14* (2006.01)
  *B05D 1/36* (2006.01)
  *B05D 1/34* (2006.01)
  *B05D 3/02* (2006.01)

(52) U.S. Cl.
  CPC .................. *F16F 1/12* (2013.01); *B05D 1/34* (2013.01); *B05D 1/36* (2013.01); *B05D 3/0254* (2013.01); *B05D 2202/10* (2013.01); *B05D 2401/20* (2013.01); *B05D 2503/00* (2013.01); *B05D 2504/00* (2013.01); *F16F 1/06* (2013.01); *F16F 2224/0208* (2013.01)

(58) Field of Classification Search
  CPC ............ B05D 2503/00; B05D 2202/10; B05D 3/0254; F16F 1/12; F16F 1/024; F16F 1/06; F16F 2224/0208; B32B 5/16
  See application file for complete search history.

(56) References Cited

U.S. PATENT DOCUMENTS

| | | | | |
|---|---|---|---|---|
| 2007/0071990 | A1* | 3/2007 | Suman | B23K 35/36 428/548 |
| 2010/0297422 | A1* | 11/2010 | Lucas | C09D 7/69 428/301.1 |
| 2011/0162788 | A1* | 7/2011 | Mizrahi | B32B 7/12 156/220 |
| 2012/0258316 | A1* | 10/2012 | Lucas | C09D 7/70 428/418 |
| 2014/0033411 | A1* | 2/2014 | Kisailus | B32B 5/26 2/455 |
| 2014/0162086 | A1* | 6/2014 | Mizrahi | B32B 27/40 428/608 |
| 2016/0133352 | A1* | 5/2016 | Hashimoto | H01L 23/3737 428/141 |
| 2016/0257845 | A1* | 9/2016 | Park | C09D 163/00 |

FOREIGN PATENT DOCUMENTS

| | | |
|---|---|---|
| JP | S5157740 A | 5/1976 |
| JP | S51124197 A | 10/1976 |
| JP | S59-97333 | 6/1984 |
| JP | S5997333 A | 6/1984 |
| JP | S60-241966 | 11/1985 |
| JP | S60241966 A | 11/1985 |
| JP | H03119020 A | 5/1991 |
| JP | H0420518 A | 1/1992 |
| JP | H05138813 A | 6/1993 |
| JP | H08-290080 | 4/1995 |
| JP | H10258472 A | 9/1998 |
| JP | 2001038150 A | 2/2001 |
| JP | 2002224612 A | 8/2002 |
| JP | 2004016966 A | 1/2004 |
| JP | 2010018913 A | 1/2010 |
| WO | WO 97/10060 | 3/1997 |

* cited by examiner

FLOCKING POWDER COATED ARTICLE

CROSS-REFERENCE TO RELATED APPLICATIONS

This application is a U.S. National Phase Application of International Application No. PCT/JP2016/083125, filed Nov. 8, 2016, which claims priority to Japanese Application No. 2015-219909, filed Nov. 9, 2015, each of which are hereby incorporated by reference in their entirety.

TECHNICAL FIELD

The present disclosure relates to a flocking powder coated article capable of performing coating and flocking without using an adhesive.

BACKGROUND ART

A spring assembly housing a coil spring is used for, for example, an automobile power lift-gate, etc. The coil spring needs to have anti-rust property and sound attenuation property. Therefore, the surface of the coil spring is subjected to coating for endowing the coil spring with the anti-rust property and flocking processing for endowing the coil spring with the sound attenuation property.

Flocking processing refers to such a processing mode, i.e., pre-coating the surface of a to-be-processed object with an adhesive, and then planting short fibers on the surface thereof. An electrostatic flocking method is widely known as a processing method of flocking. In the electrostatic flocking method, by making the short fibers flying due to electrostatic force stuck into and adhered to the adhesive-coated surface of the to-be-processed object, the short fibers are fixed on the surface of the to-be-processed object in a substantially erecting state (e.g., referring to patent documents 1 and 2).

PRIOR ART DOCUMENTS

Patent Documents

Patent document 1: Japanese Patent Publication No. 2002-224612
Patent document 2: Japanese Patent Publication No. H05-138813
Patent document 3: Japanese Patent Publication No. H10-258472
Patent document 4: Japanese Patent Publication No. 2004-16966

SUMMARY

Problem to be Solved by the Disclosure

According to the prior electrostatic flocking method, it is necessary to use an adhesive in order to adhere the short fibers. However, the adhesive does not have the anti-rust property. Thus, in order to possess the anti-rust property, a coating film having the anti-rust property must be formed prior to the flocking process. At this stage, such three procedures as coating, adhesive-coating and flocking are needed. In the procedure of coating, prior to the subsequent procedure of adhesive-coating, time is required for drying the coating film. Hence, the prior methods have the problems that the number of procedures is large, the processing is time-costing, and the manufacturing cost is high. In addition, the adhesive will be adhered to the falling short fibers during flocking. Since the adhesive is in a liquid form, it is difficult to recycle the falling short fibers. Further, many adhesives contain organic solvents, which places a heavy burden on the environment.

The present disclosure is proposed in view of such actual situations, and aims to provide a flocking powder coated article capable of performing coating and flocking without using an adhesive.

Solution for Solving the Problems

The flocking powder coated article of the present disclosure is characterized by comprising a base (base material) and a flocking coating layer, wherein the flocking coating layer includes: a coating film constituted by a powder coating material, and a portion of flocking organic filler buried in the powder coating material; and a flocking layer constituted by other portion of the flocking organic filler projecting from the coating film.

The powder coating material contains a thermosetting or thermoplastic resin. By curing the thermosetting resin contained in the powder coating material or solidifying the thermoplastic resin contained in the powder coating material, a coating film is formed. During the formation of the coating film, a portion of flocking organic filler is fixed in the coating film, and the other portion of the flocking organic filler projects from the coating film. A flocking layer is formed by the other portion of the flocking organic filler projecting from the coating film. In the flocking powder coated article of the present disclosure, the powder coating material is made to exert the function of an adhesive, and accordingly, the flocking state can be realized even without the use of an adhesive. Thus, during the manufacturing process of the flocking powder coated article of the present disclosure, the adhesive-coating procedure can be omitted. Therefore, compared with the prior art, it is possible to reduce number of the procedures so as to shorten the processing time, which thereby reduces the manufacturing cost.

The flocking organic fillers of the flocking coating layer are configured to be in an erecting state or in a tilting state relative to the surface of the base. The flocking organic fillers in the tilting state cross each other. Thus, the amount of energy absorbed by the flocking layer is increased, and the sound attenuation property is improved.

According to the flocking powder coated article of the present disclosure, adhesives for fixing the flocking organic fillers are not needed. In addition, the powder coating material does not contain an organic solvent. Thus, in the manufacturing of the flocking powder coated article of the present disclosure, no organic solvents are used. Therefore, according to the flocking powder coated article of the present disclosure, it is possible to reduce the burden on the environment. Compared with a liquid coating material, the powder coating material seldom flies apart, and is easy to recycle. In the case of a liquid coating, since the amount of the liquid coating that can be coated onto the surface of the base is determined by the surface tension, if an excessive amount is used, the excessive liquid coating will flow away, making it difficult to realize increase of the film thickness. In this regard, if a powder coating material is used, it is easy to adjust the thickness of the coating film, which also makes it very easy to increase the thickness of the film. Additionally, by proper selection for the type of the resin cooperating with the powder coating material, additives, etc., it is possible to impart desired properties to the coating film. For example, by selecting the resins with high anti-rust property, it is possible to improve the anti-rust property of the coating film.

In the manufacturing of the flocking powder coated article of the present disclosure, the powder coating material or the flocking organic filler is used in a dry state. Thus, it is easy to recycle and reuse the unattached flocking organic fillers. The flocking organic filler is more flexible than inorganic fillers, and therefore is excellent in touch feeling and not easy to break off upon adhesion and can maintain the flocking state easily.

In addition, patent document 3 discloses an electrostatic flocking steel plate, comprising, on a surface of the surface-treated steel plate, a flocking planting layer which is formed by a flocking adhesive aqueous coating composition composed of waterborne epoxy-modified polyurethane resin, etc., and an electrostatic flocking layer composed of organic short fibers and formed on the flocking planting layer. In addition, patent document 4 discloses a flocking method, comprising spraying a single-component coating comprising a carbamate emulsion onto a base, and then spraying piles. The flocking adhesive aqueous coating composition and the single-component coating comprising a carbamate emulsion used in patent documents 3 and 4 are both liquid coating materials, rather than powder coating materials.

REFERENCE SIGNS

Figure 1:
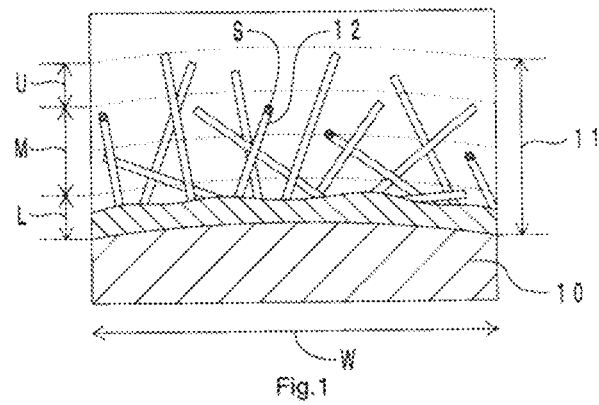
FIG. 1 is a diagram illustrating a method for judging a planting state of flocking organic fillers.

10: coil spring (base); 11: flocking coating layer; 12, 13: flocking organic filler; 110: coating film; 111: flocking layer; 20: compression testing device; 21: outer cylinder; 22: coil spring; 23: clamp; 24: acceleration pickup; 25: charge amplifier; 26: FFT analyzer; 210: core rod; 211: spring seat; 30: coil spring; 31: pedestal; 32: 1-yen coin; 4: knocking sound measurement device; 40: support member; 41: guide rail; 42: clamp; 43: coil spring; 44: steel plate; 45: noise meter; 400: base plate; 401: fixed table; 420: cylinder portion; L: lower interval; M: middle interval; U: upper interval; S: cut surface; W: measurement width.

DETAILED DESCRIPTION OF EMBODIMENTS

The embodiments of the flocking powder coated article of the present disclosure are described below. In addition, the flocking powder coated article of the present disclosure is not limited to the following embodiments, and can be implemented, without departing from the spirit of the present disclosure, in various embodiments that are subjected to many modifications, improvements and the like that a person skilled in the art can make.

(Flocking Powder Coated Article)

The flocking powder coated article of the present disclosure comprises a base and a flocking coating layer. The flocking powder coated article of the present disclosure does not have an adhesive layer for fixing flocking organic fillers.

(Base)

There are no particular limits on the base. For example, as to members made of metals, spring members such as coil springs, matching members for housing spring members, etc. can be on the list. For the materials of the spring members, spring steel used for springs are generally preferred. As to the spring members, for example, preferably, the spring steel or the like is subjected to hot forming or cold forming and then to shot blasting, etc., so as to adjust the surface roughness. In addition, it is preferable to form a membrane of phosphates such as zinc phosphate and iron phosphate on the surface of the base of the spring member. By forming a coating film on the phosphate membrane, the corrosion resistance and the adhesion of the coating film are improved, and the corrosion resistance can be further improved especially when the phosphate is zinc phosphate. The phosphate membrane can be formed just by known methods. For example, there are soaking methods in which a spring member is soaked in a phosphate solution tank, spraying methods in which a phosphate solution is sprayed onto a spring member with a spray gun or the like, etc.

(Flocking Coating Layer)

The flocking coating layer includes: a coating film constituted by a powder coating material, and portions of flocking organic fillers buried in the powder coating material; and a flocking layer constituted by the other portions of the flocking organic fillers projecting from the coating film.

The powder coating material comprises basic materials forming the coating film, i.e., resin, a curing agent, a pigment, etc. Resin may be selected from thermosetting resins and thermoplastic resins. Examples of the thermosetting resins may include epoxy resin, polyester resin, acrylic resin, fluororesin, phenolic resin, melamine resin, polyurethane resin, silicon resin, etc. Examples of the thermoplastic resins may include polyethylene resin, polypropylene resin, polyvinyl chloride resin, acrylonitrile-butadiene-styrene (ABS) resin, methacrylic resin, nylon resin, etc. For example, when needing to improve the anti-rust property of the coating film, epoxy resin is preferable. In addition, besides the anti-rust property, in the case of outdoor use of the flocking powder coated article of the present disclosure, when needing to impart weatherability to the coating film, it is preferable that epoxy resin and carboxyl-containing polyester resin are used in combination.

Examples of epoxy resin may include, for example, bisphenol A epoxy resin, bisphenol F epoxy resin, crystalline epoxy resin, etc. In addition, examples of polyester resins may include the resins resulting from ester exchange or polycondensation reaction between polyols such as ethylene glycol, diethylene glycol, triethylene glycol, propylene glycol, butylene glycol, pentylene glycol, hexylene glycol etc., and carboxylic acids such as terephthalic acid, maleic acid, isophthalic acid, succinic acid, adipic acid, sebacic acid, etc.

Examples of the curing agent may include, for example, aromatic amines, acid anhydrides, blocked isocyanate, hydroxyalkylamide (HAA), triglycidyl isocyanurate (TGIC), aliphatic dibasic acids, dicyandiamide derivatives, organic acid dihydrazide derivatives, etc. For the resin, when epoxy resin and carboxyl-containing polyester resin are used in combination, carboxyl-containing polyester resin functions as a curing agent for epoxy resin.

Examples of the pigment, for example, a coloring pigment, may include inorganic pigments such as carbon black, titanium dioxide, rouge, loess, etc., and organic pigments such as quinacridone red, phthalocyanine blue, benzidine yellow, etc. In addition, examples of extender pigments may include calcium carbonate, magnesium carbonate, talc, silica, barium sulfate, etc. The mechanical properties such as flexibility and impact resistance of the coating film can be adjusted according to the particle diameter and particle shape of the extender pigments.

In addition to the aforementioned components, the powder coating material may also comprise various additives as desired. Examples of the additives may include surface conditioners, ultraviolet absorbers, antioxidants, antistatic agents, flame retardants, etc. The powder coating material can also be manufactured by known methods, for example, manufactured by melting and mixing materials such as resins and the like, and then grinding.

There are no particular limits on the type of the flocking organic filler (referred to as "filler" sometimes hereinafter). For example, examples thereof may include nylon fibers, polyester fibers, synthetic fibers, cotton fibers, polyethylene fibers, aramid fibers, fluorofibers, etc. In particular, the fibers comprising one or more selecting from nylon fibers, polyester fibers, rayon fibers, cotton fibers and polyethylene fibers are preferable.

The surface resistance value of the flocking organic fillers is preferably greater than or equal to $1\times10^5\Omega$ and less than $1\times10^{18}\Omega$. In this description, the value measured by a teraohmmeter "SM-8220" manufactured by HIOKI (Corporation) is used as the surface resistance value. When the surface resistance value of the flocking organic fillers is less than $1\times10^5\Omega$, the flocking organic fillers have a high electrical conductivity and can be discharged easily, and accordingly, the flying property of the fillers becomes poor, which makes it difficult to perform flocking by electrostatic forces. More preferably, the surface resistance value is $1\times10^8\Omega$ or greater. On the contrary, if the surface resistance value is $1\times10^{18}\Omega$ or greater, the flying property of the fillers becomes poor due to being excessively charged, which makes it difficult to perform flocking by electrostatic forces. More preferably, the surface resistance is less than $1\times10^{17}\Omega$, and further less than $1\times10^{11}\Omega$.

As to the flocking organic filler, in order to improve dispersibility or inhibit a state of being excessively charged, it is feasible to use the fibers that have been subjected to various surface treatments such as electrodeposition treatment, water absorption treatment, waterproofing treatment, anti-rust treatment (primer), etc. For example, it is preferable that the flocking organic fillers comprise, on the surface thereof, an electrodeposition-treated film. By comprising the electrodeposition-treated film, the surface resistance value of the fillers is adjusted to a desired value, which thereby inhibits the fillers from being excessively charged and improves the flying ability at the time of flocking. In addition, fibers are easy to aggregate, and therefore tend to be tangled into a mass. In this regard, if there is an electrodeposition-treated film on the surface, the dispersibility of the fibers (the flocking organic fillers) will be improved, which thereby can inhibit aggregation of the fillers so as to achieve a substantially uniform flocking state.

The electrodeposition-treated film is formed by performing an electrodeposition treatment on the surfaces of the fibers used as the flocking organic fillers. The electrodeposition treatment may be performed by treating the fibers using tannin, tartar emetic, etc. so as to form a tannin compound, etc. on the surfaces of the fibers. In addition, the electrodeposition treatment may be performed by preparing a solution by properly mixing an inorganic salt such as barium chloride, magnesium sulfate, sodium silicate, sodium sulfate or the like, a surfactant such as quaternary ammonium salt, higher alcohol sulphate, betaine surfactants or the like, and an organic silicon compound (colloidal silica), and treating the fibers with the solution, so as to make a silicon compound adhered to the surfaces of the fibers.

The flocking organic fillers are fibrous. The length of the filler in the length direction is not particularly limited, but if the filler is too short, it will be buried in the powder coating material, making it impossible to achieve the desired flocking state. For example, the length of the filler is preferably 50 μm or greater, more preferably 200 μm or greater, and further preferably 500 μm or greater. On the other hand, if the filler is too long, it will topple, making it impossible to achieve the desired flocking state. For example, the length of the filler is preferably 2,000 μm or smaller, more preferably 1,000 μm or smaller, and further preferably 600 μm or smaller. The maximum length (thickness) of the filler in the width direction is not particularly limited, but if the filler is too thin, it will curl due to self-weight, making it impossible to achieve the desired flocking state. For example, the thickness of the filler is preferably 5 μm or greater, more preferably 10 μm or greater, and further preferably 20 μm or greater. On the other hand, if the filler is too thick, the sense of touch will become bad. For example, the thickness of the filler is preferably 50 μm or smaller, more preferably 40 μm or smaller, and further preferably 30 μm or smaller.

The coating film is formed by curing or solidifying the resin contained in the powder coating material. Portions of the flocking organic fillers are buried and fixed in the coating film, and the portions of the flocking organic fillers project from the coating film so as to form a flocking layer. The thickness of the coating film and the thickness of the flocking layer can be appropriately determined depending upon the desired properties. For example, when the length of the flocking organic filler in the length direction is greater than or equal to 50 μm and less than or equal to 2,000 μm, the thickness of the coating film is preferably greater than or equal to 30 μm and less than or equal to 500 μm. When the thickness of the coating film is less than 30 μm, the effects brought forth by coating, which is performed in order to impart the anti-rust property, etc., become poor. Moreover, as the lengths of the buried flocking organic fillers are small, it is impossible to adequately fix the flocking organic fillers. For example, portions of the flocking organic fillers buried in the coating film preferably have a length of 20 μm or greater. On the contrary, if the thickness of the coating film exceeds 500 μm, it becomes difficult to adhere the flocking organic fillers.

It is preferable that the flocking organic fillers are planted in both the erecting state and the tilting state, relative to the surface of the base. The planted flocking organic fillers cross each other, and therefore, the amount of energy absorbed by the flocking layer is increased, and the sound attenuation property is improved. It is possible to photograph a section of the flocking coating layer in the thickness direction using a scanning electron microscope (SEM) at a magnification of 100 times, so as to check the planting state of the flocking organic fillers. Moreover, whether there are flocking organic fillers in the tilting state can be determined just by the following methods.

FIG. 1 is a diagram illustrating a method for judging the planting state. The diagram of FIG. 1 schematically shows an SEM photograph (at a magnification of 100 times) of a section of the flocking powder coated article whose base is a coil spring. As shown in FIG. 1, in the SEM photograph, the length of the longest flocking organic filler is used as a reference length, the reference length is quartered, wherein the interval from the surface of the base 10 to a position at the ¼ of the length is determined as a lower interval L, the interval from the position at the ¼ of the length to a position at the ¾ of the length is determined as a middle interval M, and the interval from the position at the ¾ of the length to the top is determined as an upper interval U. Moreover, in the middle interval M, only the flocking organic fillers 12 whose cut surfaces S can be observed are considered as the fillers planted in the tilting state. In the diagram of FIG. 1, there are four fillers that can be considered to be planted in the tilting state. It is regarded that the more the tilting fillers are, the better the sound attenuation property is. For example, when the width of 1 mm of the flocking coating layer in the thickness direction and the vertical direction is taken as the measurement width W, the number of the flocking organic fillers 12 with visible cut surface S (i.e., the tilting fillers) in the middle interval M is preferably 3 or more, more preferably 6 or more.

The amount of the adhered flocking organic fillers is preferably, for example, greater than or equal to 1.2 mg/cm$^2$ and less than or equal to 80 mg/cm$^2$. When the amount of the adhered flocking organic fillers is less than 1.2 mg/cm$^2$, the manufacture thereof is difficult, and due to less fillers, the effects e.g., the sound attenuation effect, etc. achieved by flocking is weakened. The amount of the adhered flocking organic fillers is preferably 2 mg/cm$^2$ or greater. Furthermore, the effects achieved are not different even if the amount of the adhered fillers exceeds 80 mg/cm$^2$. If the manufacturing cost is taken into account, it is preferable that the amount of the adhered flocking organic fillers is 18 mg/cm$^2$ or less. In order to ensure sound attenuation property and further reduce the manufacturing cost, the amount is preferably 10 mg/cm$^2$ or less. In addition, the amount of the adhered flocking organic fillers is a measurement value which is obtained based on a contact surface of the flocking powder coated article with a matching member.

In order to improve the effects, such as rust prevention, of the coating film, it is preferable that there are no, or very few, empty holes that are referred to as "nest" (referred to as "nest-like empty holes" hereinafter) in the interior of the coating film. When there are nest-like empty holes, the nest-like empty holes are preferably as small as possible. For example, preferably, the empty holes in the section of the coating film in the thickness direction, have a maximum length of 300 µm or less in a direction on the plane perpendicular to the thickness direction.

(Method for Manufacturing the Flocking Powder Coated Article)

The flocking powder coated article of the present disclosure may be manufactured by, for example, the following two methods. The first method includes adhering, by electrostatic force, a powder coating composition prepared in advance by dry-mixing a powder coating material with flocking organic fillers to a base. In the first method, first, the powder coating material and the flocking organic fillers are placed in a container, vibrated manually or by mechanical force, and then stirred to prepare the powder coating composition. Second, the powder coating composition is adhered to the base using an electrostatic spray gun, an electrostatic flowing soaking tank, etc. In the case where an electrostatic spray gun is used, it is sufficient that the powder coating composition is charged via the nozzle of the electrostatic spray gun so as to be adhered to the surface of the base. The nozzle of the electrostatic spray gun is not necessarily applied with a voltage, as long as the powder coating composition is enabled to be charged. In the case where an electrostatic flowing soaking tank is used, it is sufficient to make the powder coating composition flow in the electrostatic flowing soaking tank and simultaneously charged by a needle discharge electrode that has been applied with a voltage, so as to make the powder coating composition adhered to the surface of the base. Finally, the base to which the powder coating composition is adhered is heated, so that the resin contained in the powder coating material is cured or solidified after being melted, to form a coating film. The heating temperature, heating duration, etc. can be determined appropriately just according to the type of the resin. In addition, heating can be performed just by using a commonly-used electric furnace, a hot air dryer, etc.

The second method comprises performing powder-coating and flocking separately. In the second method, first, a powder coating material is adhered to a base. As to the method for adhering a powder coating material to a base, known methods, such as a flowing soaking method, an electrostatic flowing soaking method and an electrostatic spraying method, can be used. In particular, the electrostatic spraying method and the electrostatic flowing soaking method that use electrostatic force are preferable. In the case where the electrostatic spraying method is used, it is sufficient that the powder coating material is charged via the nozzle of the electrostatic spray gun so as to be adhered to the surface of the base. The nozzle of the electrostatic spray gun is not necessarily applied with a voltage, as long as the powder coating material is enabled to be charged. In the case where the electrostatic flowing soaking method is used, it is sufficient to make the powder coating material flow in the flowing soaking tank and simultaneously charged by a needle discharge electrode that has been applied with a voltage, so as to make the power coating adhered to the surface of the base. Operation of adhering the powder coating material to the base may be performed for more than one time or two times. For example, adhering of the powder coating material may also be repeated again after the powder coating material is adhered to the base.

Second, the flocking organic fillers are adhered to the adhered powder coating layer by electrostatic force, i.e., the flocking organic fillers are made to be adhered, in the state where the resin contained in the powder coating material has not been cured (in the case of thermosetting resins) or has not been solidified (in the case of thermoplastic resins). At the time of adhering the flocking organic fillers by the electrostatic force, like in the case of the powder coating material, it is sufficient that an electrostatic spray gun, an electrostatic flowing soaking tank or the like is used. Finally, the base to which the powder coating material and the flocking organic fillers are adhered is heated, so that the resin contained in the powder coating material is cured or solidified after being melted, to form a coating film. The heating temperature, heating duration, etc. can be determined appropriately just according to the type of the resin. In addition, heating can be performed just by using a commonly-used electric furnace, a hot air dryer or the like.

EXAMPLES

Next, the present disclosure is described more specifically with examples.

(Manufacturing of the Flocking Powder Coated Article)

(1) Coil Spring of Example 1

A flocking powder coated article is manufactured by the first method in which a powder coating composition prepared by dry-mixing a powder coating with flocking organic fillers is used. A coil spring made of spring steel is used as the base. The total number of turns of the coil spring is 50, and the dimensions of the coil spring are as follows: an outer diameter of 27.5 mm, a free height of 570 mm, and a wire diameter of 3.7 mm. A zinc phosphate membrane is formed on the surface of the coil spring. The powder coating composition is prepared by the following method, i.e., placing 500 g of powder coating material and 500 g of flocking organic fillers in a container, and vibrating the same at a 500 mm stroke in an up-down direction. The epoxy/polyester powder coating material "INNOVAX (registered trademark) H-series" manufactured by SHINTO PAINT (Corporation) is used as the powder coating material. The nylon fibers (3.3 dtex (equivalent to 19.3 μm if converted into thickness), 500 μm in length, with an electrodeposition-treated film, having a surface resistance value of $10^{10} \sim 10^{13} \Omega$) manufactured by NISSEN Flock Manufacturing (Corporation) are used as the flocking organic fillers.

First, the powder coating composition is sprayed onto the coil spring by an electrostatic spray gun. VERSA-SPRAY II manufactured by Nordson (Corporation) is used as the electrostatic spray gun. The spray gun has a nozzle in a flat shape, which has a slit of 4 mm. The spraying conditions are as follows: the voltage is 100 kV, the spraying rate is 60 g/min, the carrier gas pressure is 2.5 MPa, the moving speed of the electrostatic spray gun is set to be 50 mm/sec, and the working distance is set to be 200 mm. The spraying is performed in a manner as follows: moving the electrostatic spray gun from the top down in a state where the coil spring is placed vertically, wherein at this time, the slit of the nozzle faces the same direction as the axial direction of the coil spring, thereafter, rotating the coil spring about the axis by 90° to move the electrostatic spray gun from the bottom up, then rotating the coil spring about the axis by 180° in the same direction to move the electrostatic spray gun from the top down, and finally, rotating the coil spring about the axis by 90° in a returning direction to move the electrostatic spray gun from the bottom up. Thus, the operation of spraying the powder coating composition to the whole periphery of the coil spring is performed for four times in total. The coil spring is then placed in a hot air drier for baking at 200° C. for 20 minutes. In this way, epoxy resin and polyester resin in the powder coating material are cured to form a coating film. The coil spring subjected to the flocking powder-coating in this way is referred to as the coil spring of Example 1. The amount of the adhered flocking organic fillers of the coil spring of Example 1 is 6 mg/cm². The coil spring of Example 1 is included in the flocking powder coated article of the present disclosure.

An SEM photograph of a section of the coil spring of Example 1 in the thickness direction is taken at a magnification of 100 times. The thickness of the coating film is 350 μm. The total thickness of the coating film and the flocking layer (the thickness of the coating film+the maximum length of the flocking organic filler) is 450 μm. In addition, it is confirmed that the coating film has nest-like empty holes. The maximum length of the empty holes in a direction on the plane perpendicular to the thickness direction of the coating film is 280 μm.

(2) Coil Spring of Example 2

A flocking powder coated article is manufactured by the second method in which powder-coating and flocking are performed separately, wherein the coil spring of the base, the powder coating material and the flocking organic fillers are the same as those used for the flocking powder-coating in Example 1.

First, the powder coating material is sprayed onto the coil spring by an electrostatic spray gun. "BPS700" (having a reflective plate-type nozzle) manufactured by ASAHI SUNAC (Corporation) is used as the electrostatic spray gun. The spraying conditions are as follows: the voltage is 100 kV, the spraying rate is 70 g/min, the moving speed of the electrostatic spray gun is 40 mm/sec, and the working distance is 200 mm. The spraying is performed in a manner as follows: moving, in the state where the coil spring is vertically placed (axial direction=up-down direction), the electrostatic spray gun from the bottom up, from the top down and from the bottom up, i.e. moving the electrostatic spray gun in the up-down direction for 3 times (1.5 roundtrips), and then rotating the coil spring about the axis by 180°, and moving the electrostatic spray gun for 1.5 roundtrips in the same manner.

Next, the flocking organic fillers are sprayed onto the coil spring by an electrostatic spray gun. NU-070P manufactured by ASAHI SUNAC (Corporation) is used as the electrostatic spray gun. The spray gun has a nozzle in a flat shape, which has a slit of 4 mm. The spraying conditions are as follows: the voltage is 100 kV, the spraying rate is 100 g/min, the carrier gas pressure is 0.1 MPa, the moving speed of the electrostatic spray gun is 50 mm/sec, and the working distance is 200 mm. The spraying is performed in a manner as follows: like those performed when spraying the powder coating material, moving the electrostatic spray gun from the bottom up in the state where the coil spring is vertically placed, wherein at this time, the slit of the nozzle faces the same direction as the axial direction of the coil spring, thereafter, rotating the coil spring about the axis by 90° each time, and moving the electrostatic spray gun in the same manner each time. In this way, the operation of spraying the flocking organic fillers to the whole periphery of the coil spring is performed for four times in total.

The coil spring is then placed in a hot air drier for baking at 200° C. for 20 minutes. In this way, epoxy resin and polyester resin in the powder coating material are cured to form a coating film. The coil spring subjected to the flocking powder-coating in this way is referred to as the coil spring of Example 2. The amount of the adhered flocking fillers in the coil spring of Example 2 is 3 mg/cm². The coil spring of Example 2 is included in the flocking powder coated article of the present disclosure.

Figure 2:
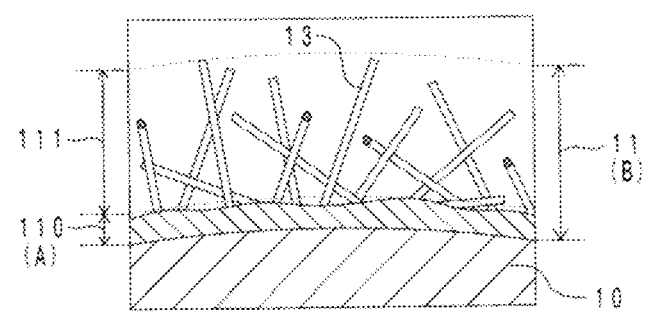
FIG. 2 is a schematic sectional view showing the vicinity of the surface of a coil spring of Example 2.

FIG. 2 is a schematic sectional view of the vicinity of the surface of the coil spring of Example 2. As shown in FIG. 2, a flocking coating layer 11 is formed on the surface of the coil spring 10. The flocking coating layer 11 comprises a coating film 110 and a flocking layer 111. In the flocking coating layer 11, portions of the flocking organic fillers 13 are buried in the coating film 110, and the other portions thereof project from the coating film 110. An SEM photograph of a section of the coil spring of Example 2 in the thickness direction is taken at a magnification of 100 times. The thickness (denoted with A in FIG. 2) of the coating film 110 is 100 μm. The total thickness of the coating film 110 and the flocking layer 111 (the thickness of the coating film+the maximum length of the flocking organic filler, denoted with B in FIG. 2) is 600 μm. In the section of the coating film 110, no nest-like empty holes are seen.

(3) Coil Spring of Comparative Example 1

A flocking-processed article is manufactured by a prior method in which an adhesive is used. For the coil spring which is used as the base, a coil spring pre-coated with Geomet (registered trademark) is used. By coating the Geomet, a layered Geomet membrane formed by superposition of inorganic adhesive-adhered metal flakes is formed on the surface of the coil spring. The Geomet membrane has anti-rust property. Total number of turns, dimensions, etc. of the coil spring is the same as that used in the flocking powder-coating in example 1 in terms of the total number of turns, dimensions, etc. The acrylic acid-styrene copolymer resin adhesive "Yodosol (registered trademark) AA76" manufactured by Henkel Japan is used as the adhesive. The flocking organic filler is the same as that used in the flocking powder-coating in Example 1.

First, an adhesive is sprayed onto the coil spring by a spray gun ("W-100" manufactured by ANEST IWATA (Corporation), having a nozzle with the diameter of 1.8 mm). Spraying is performed by moving the spray gun back and forth a dozen times while rotating the coil spring. The spray gun is moved at a speed of 600 mm/sec, the spraying duration is 80 seconds, and the working distance is 50 mm. Next, the flocking organic fillers are sprayed by an electrostatic spray gun onto the surface of the sprayed adhesive. The electrostatic spray gun used is the same as that used in the flocking powder-coating in Example 1 ("VERSA-SPRAY II" manufactured by Nordson (Corporation)). The spraying conditions are as follows: the voltage is 1 kV, the spraying rate is 100 g/min, the moving speed of the electrostatic spray gun is 600 mm/sec, the spraying duration is 60 seconds, and the working distance is 50 mm. Spraying is performed by moving the electrostatic spray gun back and forth a dozen times while rotating the coil spring. The coil spring is then placed in a hot air dryer for baking at 70° C. for 20 minutes, and then at 130° C. for 5 minutes. The coil spring processed by flocking in this manner is referred to as the coil spring of Comparative Example 1.

(Evaluation of Sound Attenuation Property)

Figure 3:
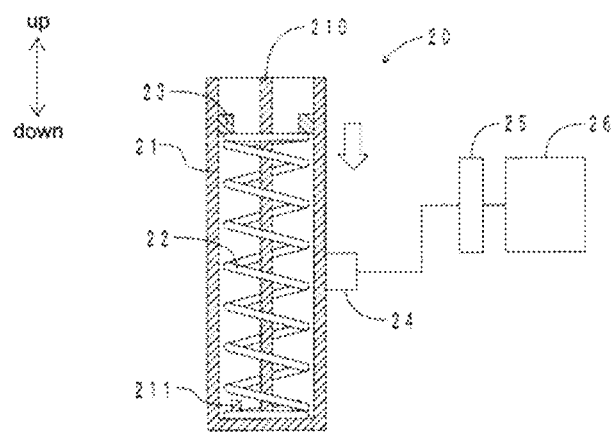
FIG. 3 is an overview of a compression testing device.

If a coil spring is compressed to bend, the bent portion will abut against a adjacent member, thereby producing a knocking sound. Thus, a compression test is conducted on the coil springs of Example 1, Example 2 and Comparative Example 1, to evaluate the sound attenuation property brought about by the flocking by measuring the vibration levels of the knocking sounds produced by the bending of the coil springs. FIG. 3 is an overview of a compression testing device.

As shown in FIG. 3, the compression testing device 20 comprises an outer cylinder 21, a coil spring 22 and a clamp 23. The outer cylinder 21 is in a shape of a cylinder that opens upwardly and has a bottom. A core rod 210 is erected on the bottom surface of the outer cylinder 21. The core rod 210 is provided at the radial center of the outer cylinder 21. A spring seat 211 is provided at the bottom surface of the outer cylinder 21 in a manner of surrounding the core rod 210. The coil spring 22 is housed in the outer cylinder 21. The coil spring 22 is provided in such a way that the core rod 210 is taken as a shaft, with the lower end turn sleeved over the spring seat 211. The clamp 23 is in a ring shape and can move in an up-down direction along the inner circumferential surface of the outer cylinder 21. The clamp 23 abuts against the upper end turn of the coil spring 22. An acceleration pickup 24 is mounted on the outer circumferential surface of the outer cylinder 21. The acceleration pickup 24 is connected with an FFT (fast Fourier transform) analyzer 26 via a charge amplifier 25.

The clamp 23 is made to move downwardly to compress the coil spring 22. If the compression load reaches a certain value, the axis of the coil spring 22 is bent into a wave form or helical-form, etc. That is, the coil spring 22 is bent. Thus, a bent portion is formed on the coil spring 22. When the bent portion abuts against the inner circumferential surface of the outer cylinder 21, a knocking sound is generated. The generated knocking sound is detected by the acceleration pickup 24, and the vibration level is measured by the FFT analyzer 26. In this example, "2354A" manufactured by SHOWA SOKKI (Corporation) is used as the acceleration pickup 24. In addition, "CH-1200A" manufactured by ONO SOKKI (Corporation) is used as the charge amplifier 25, and "DS-3000" manufactured by ONO SOKKI is used as the FFT analyzer 26.

Figure 4:
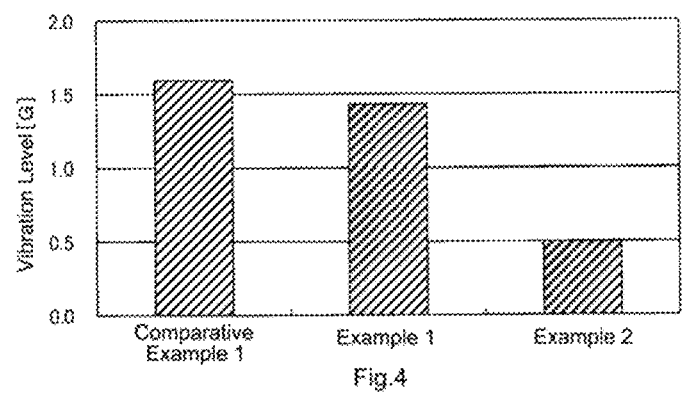
FIG. 4 is a chart illustrating the vibration levels of knocking sounds in a compression test.

FIG. 4 shows the vibration levels of the knocking sounds in the coil spring of Example 1, the coil spring of Example 2 and the coil spring of Comparative Example 1. As shown in FIG. 4, the vibration level of the coil spring of Example 1 is slightly lower than that of the coil spring of Comparative Example 1, and the vibration level of the coil spring of Example 2 is lowered to about ⅓ of the vibration level of the coil spring of Comparative Example 1. Thus, it is confirmed that the flocking powder coated article of the present disclosure has equivalent or better sound attenuation property, compared with the existing flocking-processed article comprising an adhesive layer.

(Evaluation of Corrosion Resistance)

A salt spray test is conducted on the coil springs of Example 1, Example 2 and Comparative Example 1 to evaluate the corrosion resistance (anti-rust property). In the salt spray test, the salt spraying tester "STP-160" manufactured by Suga Test Instruments (Corporation) is used. The test conditions are based on the neutral salt spray test in the salt spray test methods specified in JIS (Japanese Industrial Standards) Z 2371:2000, wherein the salt concentration is 5 mass %, the temperature is 35° C., and whether there is red rust generated is determined after 72 hours, 240 hours, 480 hours and 720 hours, respectively. As to determining whether there is red rust, the flocking coating layer, etc. is stripped to confirm the texture of the coil spring through visual observation.

The results of the salt spray test are as follows: no red rust is observed on the coil springs of Example 1, Example 2 and Comparative Example 1 even after 720 hours have lapsed. Thus, it is determined that the flocking powder coated article of the present disclosure has an equivalent corrosion resistance, compared with the existing flocking-processed article comprising an adhesive layer.

(Evaluation of Adhesion of the Filler)

A flocking powder coated article is manufactured by performing flocking powder-coating on the surface of a test piece using the same powder coating composition as that in Example 1. As to the test piece, a cold-rolled steel sheet (SPCC-SD, having a rectangular plate shape with 70 mm (length)×150 mm (width), and a thickness of 0.8 mm) manufactured by Japanese Test panel (Corporation) is used. A zinc phosphate membrane is formed on the surface of the test piece. The method for coating the flocking powder is as follows.

First, the powder coating composition is sprayed onto the surface of the test piece by an electrostatic spray gun. The electrostatic spray gun used is the same as that used in the flocking powder-coating in Example 1 ("VERSA-SPRAY II" manufactured by Nordson (Corporation)). The spraying conditions are as follows: the voltage is 100 kV, the spraying rate is 60 g/min, the carrier gas pressure is 2.5 MPa, the moving speed of the electrostatic spray gun is 300 mm/sec, and the working distance is 200 mm. Spraying is performed by making the electrostatic spray gun reciprocate twice in the longitudinal direction of the test piece, and at this time, the facing direction the slit of the nozzle is the transverse direction of the test piece. The test piece is then placed in a hot air dryer for baking at 200° C. for 20 minutes. In this way, epoxy resin and polyester resin in the powder coating material are cured to form a coating film. The test piece subject to flocking powder-coating in this manner is referred to as the test piece of Example 3. The test piece of Example 3 is included in the flocking powder coated article of the present disclosure.

For the purpose of comparison, a flocking-processed article is manufactured by an existing method in which an adhesive is used, using the same test piece as in Example 3. The adhesive and the flocking organic fillers are the same as those used in the flocking coating in Comparative Example 1. The flocking method is as follows.

First, an adhesive is sprayed onto the surface of the test piece by a spray gun ("W-100" manufactured by ANEST IWATA (Corporation)) used in the flocking coating in Comparative Example 1. Spraying is performed by making the spray gun reciprocate twice in the longitudinal direction of the test piece. The moving speed of the spray gun is 300 mm/sec, the spraying duration is 1 second, and the working distance is 50 mm. Second, the flocking organic fillers are sprayed onto the surface of the sprayed adhesive by the electrostatic spray gun ("VERSA-SPRAY II" manufactured by Nordson (Corporation)) used in the flocking powder-coating in Example 1. The spraying conditions are as follows: the voltage is 1 kV, the spraying rate is 100 g/min, the moving speed of the electrostatic spray gun is 300 mm/sec, the spraying duration is 1 second, and the working distance is 200 mm. Spraying is performed by making the spray gun reciprocate twice in the longitudinal direction of the test piece. Finally, the test piece is placed in a hot air dryer for baking at 70° C. for 20 minutes, and further at 130° C. for 5 minutes. The test piece processed by flocking in this manner is referred to as the test piece of Comparative Example 2.

Figure 5:
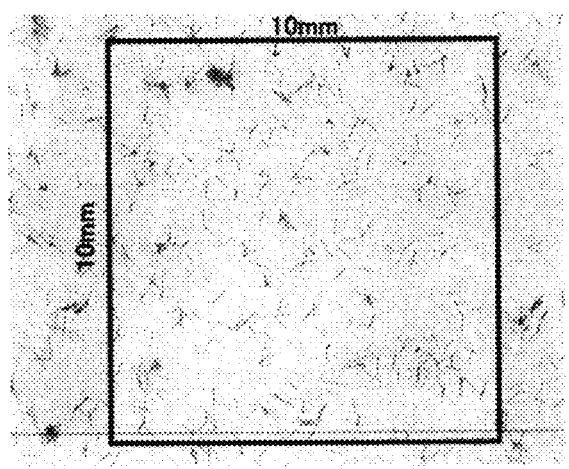
FIG. 5 is an enlarged photograph of an adhesive tape adhered to a test piece of Example 3.
Figure 6:
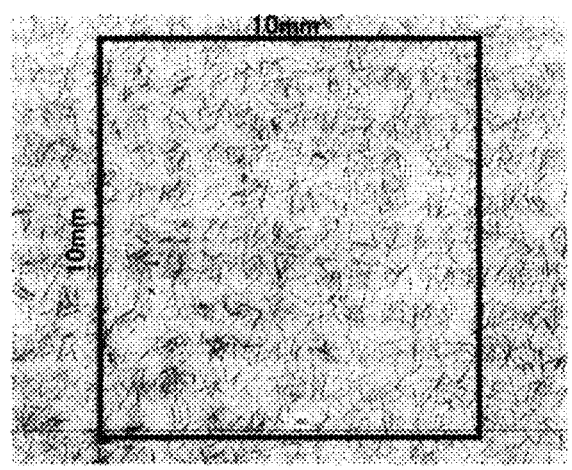
FIG. 6 is an enlarged photograph of an adhesive tape adhered to a test piece of Comparative Example 2.

A tape stripping test is conducted on the test piece of Example 3 and the test piece of Comparative Example 2 to evaluate the falling difficulty of the flocking organic fillers. The tape stripping test is conducted in the following manner: first, performing air blasting on the flocking coating layer of each test piece to remove the fillers that are not fixed; second, adhering an adhesive tape ("Cellotape (registered trademark) CT-24" manufactured by Nichiban (Corporation)) to the flocking coating layer with a finger pulp, and then stripping the adhesive tape; and finally, performing comparison on the amounts of the flocking organic fillers adhered to the adhesive tapes. FIG. 5 is an enlarged photograph of the adhesive tape that has been adhered to the test piece of Example 3. FIG. 6 is an enlarged photograph of the adhesive tape that has been adhered to the test piece of Comparative Example 2.

As can be known from the comparison between FIG. 5 and FIG. 6, the amount of the fillers adhered to the adhesive tape that has been adhered to the test piece of Example 3 is less than the amount of the fillers adhered to the adhesive tape that has been adhered to the test piece of Comparative Example 2. Thus, it is determined that in the flocking powder coated article of the present disclosure, the fillers are more difficult to fall off than those of the existing flocking-processed article comprising an adhesive layer.

The flocking coating layer of the test piece of Example 3 is formed by using a powder coating composition. The powder coating composition is prepared by mixing flocking organic fillers with a powder coating material. In such a case, it can be regarded that the flocking organic fillers are difficult to fall off as they are fixed by intertwined with (tangled with each other) the powder coating material. If the flocking organic fillers are difficult to fall off, not only the properties such as the sound attenuation property and the like will not become poor easily, but also other advantages will further be achieved, for example, the assembly of the flocking powder coated article is not prone to soil surrounding environment, and the possibility that the falling fillers hinder the actions of other members is low, and so on.

(Adjustment of the Thickness of the Film)

Figure 7:
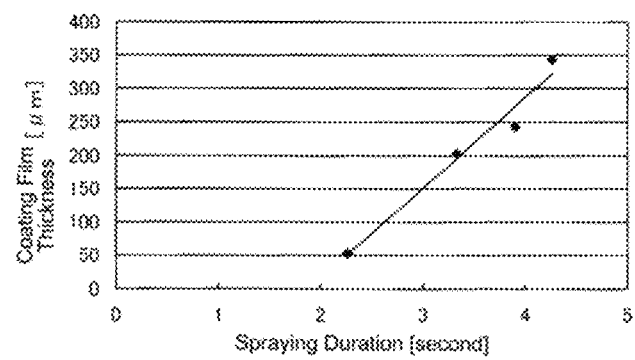
FIG. 7 is a chart of a coating thickness versus spraying duration of a powder coating composition.

In the flocking powder-coating method for manufacturing the test piece of Example 3, the relation between the spraying duration of the powder coating composition and the thickness of the coating film is investigated. FIG. 7 shows change in the thickness of the coating film of the powder coating composition along with the spraying duration. As shown in FIG. 7, the thickness of the coating film is almost increased proportionally along with the spraying duration of the powder coating composition. In this way, if the powder coating composition, prepared by dry-mixing the powder coating material with the flocking organic fillers, is used, the thickness of the coating film can be easily adjusted only by adjusting the spraying duration of the powder coating composition. For example, in the flocking powder coated article of the present disclosure, when the thickness of the coating film is increased, the corrosion resistance and the sound attenuation property are further improved.

(Relation Between the Planting State and the Sound Attenuation Property)

(1) Spring Constant

Figure 8:
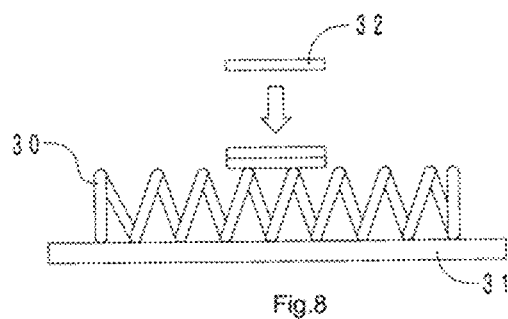
FIG. 8 is a diagram illustrating a method for measuring a spring constant of a flocking layer.

The spring constant of the flocking layer of the coil spring of Example 2 is measured. FIG. 8 is a diagram illustrating the measuring method. As shown in FIG. 8, first, the coil spring 30 is transversely placed on a pedestal 31, and the height of the flocking layer on the upper side surface is measured. Second, 1-yen coins 32, each having the mass of 1 g, are placed at this side surface one by one in a stacking manner, and the height of the flocking layer is measured at each placement of the coin. Finally, the spring constant is calculated according to the displacement (the amount of deflection) obtained according to the change in the height of the flocking layer along with the load applied. The height of the flocking layer is measured by a laser displacement meter.

For comparison purposes, for an existing coil spring used in a spring assembly (manufactured by STABILUS company) for an automobile power lift-gate, the spring constant of the flocking layer is measured by the same method. The coil spring is manufactured by the following three procedures: forming a coating film by drying after coating, applying an adhesive and performing flocking thereon. In the following, the coil spring is referred to as the coil spring of Comparative Example 3.

Figure 9:
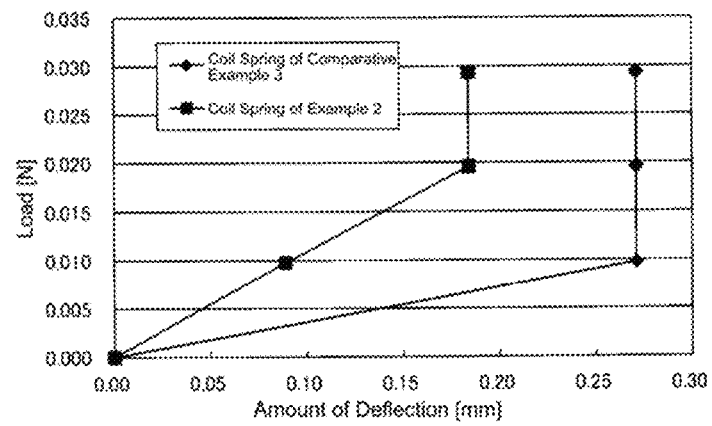
FIG. 9 is a chart illustrating the relation between the load and the amount of deflection of the coil springs of Example 2 and Comparative example 3.

FIG. 9 illustrates, with a chart, the relation between the load and the amount of deflection of the two coil springs. As can be seen from FIG. 9, compared with the coil spring of Comparative Example 3, the coil spring of Example 2 has a greater curve inclination, i.e., having a greater spring constant. For the coil spring of Example 2, the calculated spring constant is 0.11 N/mm, and for the coil spring of Comparative Example 3, the calculated spring constant is 0.04 N/mm.

(2) Planting State

Three coil springs that have been subjected to flocking powder-coating using the same method as that for the coil spring of example 2 are prepared, and are denoted as Examples 2a, 2b and 2c. In addition, besides the aforementioned coil spring of Comparative Example 3, an existing coil spring used for a spring assembly (manufactured by Edosha company) for an automobile power lift-gate is used as the coil spring of Comparative Example 4. The coil spring of Comparative Example 4 is also manufactured by the three procedures, i.e., forming a coating film by drying after coating, applying an adhesive and performing flocking thereon.

For the prepared five coil springs, the planting states of the fillers are studied. As previously stated in the description of FIG. 1, first, an SEM photograph (with a magnification of 100 times) of a section is taken for each coil spring, and then, with the width being the measurement width of 1 mm, the fillers, whose cut surfaces can be observed in the middle interval from the surface of the coil spring to ¼-¾ of the length, are regarded as tilting fillers, and the number of the tilting fillers is calculated. Table 1 shows the results.

TABLE 1

|  | Example 2a | Example 2b | Example 2c | Comparative Example 3 | Comparative Example 4 |
| --- | --- | --- | --- | --- | --- |
| Number of the tilting fillers | 9 | 11 | 5 | 2 | 1 |
| Sound pressure ratio | 0.6 | 0.6 | 0.8 | 1.0 | 1.0 |

As shown in Table 1, compared with the coil springs of Comparative Examples 3 and 4, the coil springs of Examples 2a, 2b and 2c have more tilting fillers.

(3) Evaluation of Sound Attenuation Property

Figure 10:
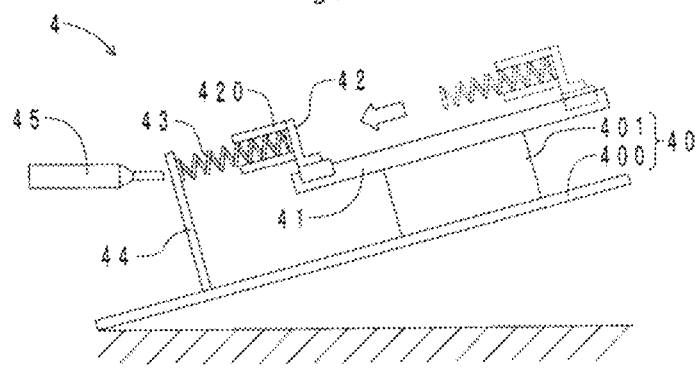
FIG. 10 is an overview of a knocking sound measurement device.

The sound attenuation property is evaluated for the coil springs of Examples 2a, 2b and 2c and Comparative Examples 3 and 4. FIG. 10 is an overview of a knocking sound measurement device. As shown in FIG. 10, the knocking sound measurement device 4 comprises a support member 40, a guide rail 41, a clamp 42, a coil spring 43 and a steel plate 44.

The support member 40 comprises a base plate 400 and a fixed table 401 carried on the base plate 400. The base plate 400 is provided to tilt by an angle of 8° relative to the floor. The guide rail 41 is mounted on the upper surface of the fixed table 401. The guide rail 41 extends in the left-right direction. At the beginning of the measurement, in FIG. 10, as shown by the dotted lines, the clamp 42 is mounted on the right end side of the guide rail 41. The clamp 42 can move along the guide rail 41. The clamp 42 comprises a cylinder portion 420. The cylinder portion 42 is in the shape of a cylinder opening leftwards and having a bottom. One side of the coil spring 43 in the axial direction is housed in the cylinder portion 420. The end turn of the housed coil spring 43 are sleeved over a spring seat (not shown) of the cylinder portion 420. The steel plate 44 is vertically arranged on the base plate 400. The steel plate 44 is arranged opposite to the left end side of the guide rail 41.

The knocking sound is measured in the following manner. In FIG. 10, as shown by the hollow arrow, the clamp 42 is made to slide leftwards at a speed of 320 mm/sec, so that the coil spring 43 collides with the steel plate 44. The knocking sound at this moment is measured by a noise meter 45. The measurement results of the knocking sound are summarized and shown in the above Table 1. In Table 1, the knocking sound is represented by the sound pressure ratio when the sound pressure of the coil spring of Comparative Example 3 is set to 1.0. The less the sound pressure ratio is, the better the sound attenuation property is. As shown in Table 1, compared with the knocking sounds of the coil springs of Comparative Examples 3 and 4, the knocking sounds of the coil springs of Examples 2a, 2b and 2c having three or more tilting fillers all become small. It can especially be determined that the coil springs of Examples 2a and 2b having six or more tilting fillers have the knocking sounds each being 60% of the knocking sounds of the coil springs of Comparative Examples 3 and 4, exhibiting excellent sound attenuation property.

It can be determined from the above contents that the flocking powder coated article of the present disclosure comprises flocking organic fillers planted in the tilting state, and in the flocking powder coated article of the present disclosure, the flocking layer has a great spring constant and has excellent sound attenuation property.

The invention claimed is:

1. A flocking powder coated article comprising a base and a flocking coating layer,
   wherein the flocking coating layer comprises:
   a coating film, comprising a powder coating material,
   a flocking layer, and
   a plurality of flocking organic fillers, wherein each flocking organic filler of the plurality of flocking organic fillers comprises a first portion and a second portion,
   wherein the first portion of each flocking organic filler of the plurality of flocking organic fillers is buried in the powder coating material, the second portion of each flocking organic filler of the plurality of flocking organic fillers projects from the coating film, thereby forming the flocking layer,
   wherein the plurality of flocking organic fillers are planted in both an erecting state and a tilting state, relative to a surface of the base, and each flocking organic filler of the plurality of flocking organic fillers crosses another flocking organic filler of the plurality of flocking organic fillers.

2. The flocking powder coated article according to claim 1, wherein the flocking powder coated article has no adhesive layer for fixing the plurality of flocking organic fillers.

3. The flocking powder coated article according to claim 1, wherein the plurality of flocking organic fillers comprise one or more fibers selected from the group consisting of nylon fibers, polyester fibers, synthetic fibers, cotton fibers and polyethylene fibers.

4. The flocking powder coated article according to claim 1, wherein the powder coating material contains a thermosetting resin.

5. The flocking powder coated article according to claim 1, wherein a thickness of the coating film is greater than or equal to 30 μm and less than or equal to 500 μm.

6. The flocking powder coated article according to claim 1, wherein a length of each flocking organic filler of the plurality of the flocking organic fillers in a length direction of the plurality of flocking organic fillers is greater than or equal 50 μm and less than or equal to 2,000 μm, and
   the first portion of each flocking organic filler of the plurality of the flocking organic fillers buried in the coating film has a length of 20 μm or greater.

7. The flocking powder coated article according to claim 1, wherein the coating film has nest-like empty holes, and
   the empty holes, in a section of the coating film in a thickness direction, have a maximum length of 300 μm or less, in a direction on a plane perpendicular to the thickness direction.

8. The flocking powder coated article according to claim 1, wherein the coating film has no nest-like empty holes.

9. The flocking powder coated article according to claim 8, wherein the base is embodied as a spring member.

10. The flocking powder coated article according to claim 2, wherein the coating film has nest-like empty holes, and the empty holes, in a section of the coating film in a thickness direction, have a maximum length of 300 μm or less, in a direction on a plane perpendicular to the thickness direction.

11. The flocking powder coated article according to claim 3, wherein the coating film has nest-like empty holes, and the empty holes, in a section of the coating film in a thickness direction, have a maximum length of 300 μm or less, in a direction on a plane perpendicular to the thickness direction.

12. The flocking powder coated article according to claim 4, wherein the coating film has nest-like empty holes, and the empty holes, in a section of the coating film in a thickness direction, have a maximum length of 300 μm or less, in a direction on a plane perpendicular to the thickness direction.

13. The flocking powder coated article according to claim 5, wherein the coating film has nest-like empty holes, and the empty holes, in a section of the coating film in a thickness direction, have a maximum length of 300 μm or less, in a direction on a plane perpendicular to the thickness direction.

14. The flocking powder coated article according to claim 6, wherein the coating film has nest-like empty holes, and the empty holes, in a section of the coating film in a thickness direction, have a maximum length of 300 μm or less, in a direction on a plane perpendicular to the thickness direction.

15. The flocking powder coated article according to claim 2, wherein the coating film has no nest-like empty holes.

16. The flocking powder coated article according to claim 3, wherein the coating film has no nest-like empty holes.

17. The flocking powder coated article according to claim 4, wherein the coating film has no nest-like empty holes.

18. The flocking powder coated article according to claim 5, wherein the coating film has no nest-like empty holes.

19. The flocking powder coated article according to claim 6, wherein the coating film has no nest-like empty holes.

20. The flocking powder coated article according to claim 1, wherein the base is embodied as a spring member.

* * * * *

UNITED STATES PATENT AND TRADEMARK OFFICE
CERTIFICATE OF CORRECTION

PATENT NO. : 11,007,549 B2
APPLICATION NO. : 15/774826
DATED : May 18, 2021
INVENTOR(S) : Yamashita et al.

It is certified that error appears in the above-identified patent and that said Letters Patent is hereby corrected as shown below:

In the Specification

In Column 5, Line 26, please replace "synthetic fibers" with "rayon fibers."

In the Claims

In Claim 3, Column 16, Line 42, please replace "synthetic fibers" with "rayon fibers."

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*